Figure 1:
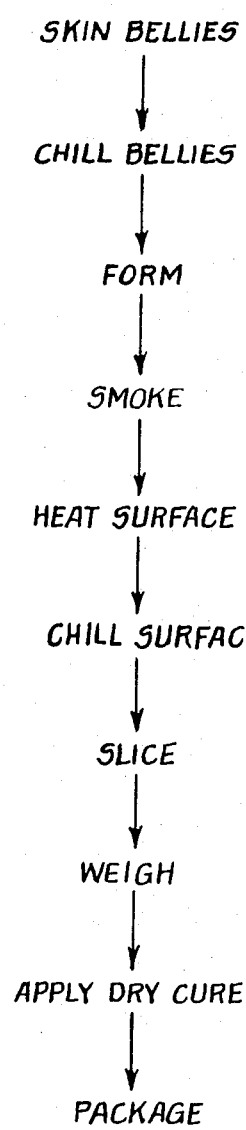

United States Patent Office 3,359,121
Patented Dec. 19, 1967

3,359,121
METHOD OF PREPARING PACKAGED
SLICED BACON
John C. Bard and Everett V. Podebradsky, Madison, Wis., assignors to Oscar Mayer & Co., Inc., Chicago, Ill., a corporation of Illinois
Filed July 22, 1964, Ser. No. 384,304
7 Claims. (Cl. 99—174)

This invention relates to certain improvements and innovations in the production of bacon, and more particularly to an accelerated method of producing sliced bacon packaged in oxygen-free containers.

Most of the bacon consumed today is sold in sliced condition. The conventional process for producing sliced bacon is relatively time-consuming and expensive. In the conventional process whole bacon bellies are first cured, either by pumping with wet cure solution (i.e. pickle) or by dry curing, after which they are allowed to stand a sufficient time (e.g. from a few hours to several days) for the cure to become distributed therethrough. The cured bellies are then hung in a smokehouse wherein they are processed with smoke and heat for a time ranging from 6 to 24 hours. Upon removal from the smokehouse the whole bellies are chilled and thereafter they are formed or shaped and then sliced and packaged.

Obviously, considerable labor is expended in carrying out the conventional process and a considerable lapse in time is involved. There is also a considerable investment involved in inventory of product in process and in equipment, e.g. curing boxes, cooler space, and handling equipment. Furthermore, there is considerable waste due to belly ends and pickle pockets which would give unacceptable slices and hence, have to be rejected and used in low-grade by-products.

One of the phases of the conventional bacon producing process which entails considerable expense is the curing phase. Depending upon the particular procedure used, it may, as indicated, take from a few hours to several days in which to cure a bacon belly. In an effort to improve and shorten the curing phase of the process it has been previously proposed that bellies and other pieces of bacon meat be first sliced and then the individual slices cured with or without smoking. Patent 2,974,047 discloses such a procedure while Patent 2,528,832 discloses a process wherein individual slices of bacon are smoked. However, the handling (either manually or by machine) of individual bacon slices during either smoking, or during curing wherein the slices are either dipped in curing solution or cure solution or dry mixture is applied to the individual slices, requires re-stacking the slices for packaging, and this step in itself is a relatively awkward and expensive operation. Hence, these modifications of the conventional bacon-making process having not met with substantial success and for the most part, whole bacon bellies continue to be cured, smoked and sliced and packaged by the conventional process.

It was discovered in accordance with the present invention that it is entirely feasible to apply curing composition to sliced uncured bacon while the slices are still in the conventional shingled stacked condition as they come from the slicer and then package the bacon in oxygen-free containers whereupon the cure mixture will become uniformly distributed throughout the packaged product while the same is being handled in the normal procedure and trade channels prior to being opened and consumed by the customer. Generally speaking, bacon will not be delivered to the retailer, sold and consumed within seven days after packing, and assuming this minimum time is available, it is necessary to distribute the cure composition over only the lean shingled surface of the sliced bacon prior to the packaging thereof. On the other hand if the bacon is likely to be consumed within seven days of packaging then a portion of the cure composition should also be applied to the fat shingled surface. It was unexpectedly found that on applying the curing composition to the lean shingled surface of the sliced bacon, or to that surface and also the shingled fat surface, that the cure composition would readily become, first adequately, and then uniformly, distributed throughout the individual unseparated slices. Apparently, the cure composition is readily absorbed from the exposed edges of the shingled slices and when dry cure becomes liquefied some of it may seep down in the capillary spaces between adjacent slices. In any event, test results show that the cure composition does become properly and uniformly distributed even when it is applied to only the shingled lean surface.

Before the dry cure composition is applied to the shingled bacon slices certain preliminary processing steps are carried out in order to obtain an improved packaged end product. Since bacon is normally smoked, one of these preliminary steps is smoking the skinned bacon bellies. Another step is that of heating only the surfaces of the smoked bellies to set the smoke constituents by polymerization and chemical reaction with the meat and to produce a small desired amount of shrinkage in weight. After heating, the bellies are chilled, either enough to chill only the surface if the bellies were already chilled prior to surface heating, or enough for forming purposes if the bellies were not previously chilled. The chilling also effects a desired amount of weight shrinkage. Of the foregoing steps only smoking and chilling for forming purposes are conventional in the manufacture of bacon.

The object of the present invention, generally stated, is the provision of an improved process of manufacturing packaged sliced bacon wherein the bacon is packaged in oxygen-free (i.e. evacuated or inert gas-filled) containers.

More specifically, an object of the invention is to expedite and simplify the conventional process of producing and packaging sliced, cured bacon in oxygen-free containers whereby production costs are substantially reduced by reason of the fact that the curing takes place in the packages so that the usual curing time and equipment therefor are eliminated and by reason of the further fact that pickle pockets are eliminated and end portions of fresh bacon bellies can be used for other purposes where their full value as fresh meat is retained rather than having to be cured and then disposed of in other low-cost uses.

Another important object of the invention is a novel and shortened process of producing packaged sliced bacon wherein: the fat shingled surfaces are golden brown in color; the lean shingled surfaces have a slightly subdued color characteristic of conventional bacon; the slices do not impart undesirable smoke odor or stain on handling; the frying characteristics are improved in that the tendency to stick to the pan and to "brown" it are reduced; and weight shrinkage can be controlled so as to comply with governmental regulations where necessary.

Certain other objects of the invention will, in part, be obvious and will in part appear hereinafter.

Figure 2:
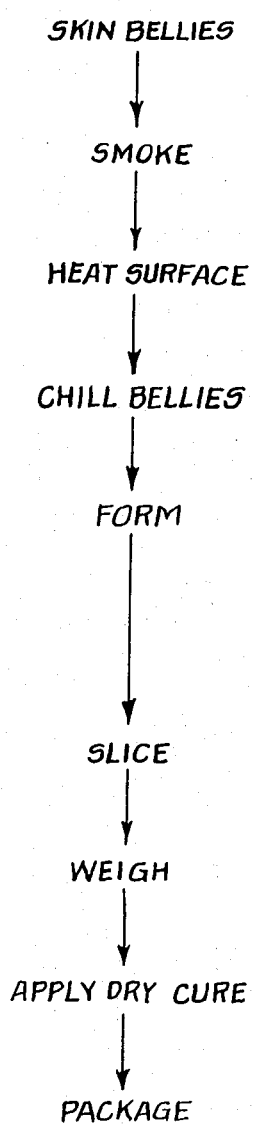
Figure 3:
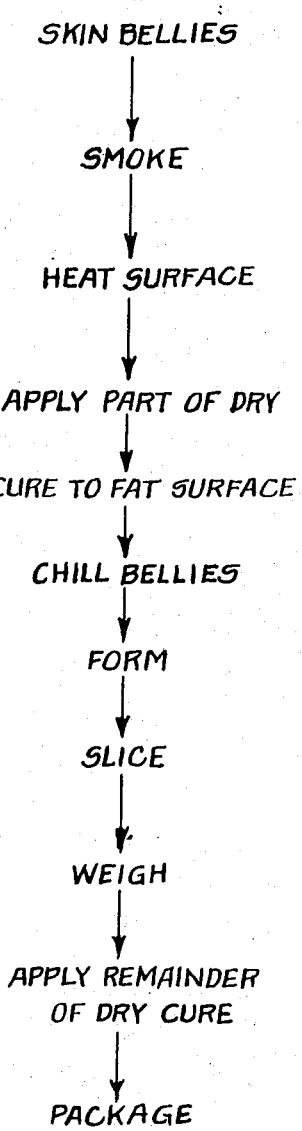

For a more complete understanding of the nature and scope of the invention reference may now be had to the following detailed description thereof taken in connection with the accompanying drawing wherein:

FIGS. 1, 2 and 3 are flow diagrams illustrating three different embodiments of the invention.

EXAMPLE 1 (FIG. 1)

Fresh bacon bellies are skinned and then chilled to approximately 28° F. The chilled bellies are formed on a Dohm & Nelke bacon press and subjected to dense hardwood smoke for 15 minutes in a smokehouse. The smoked bellies are next placed in a Fostoria infra-red oven and exposed to 1600 watt quartz lamps at a distance of 10 inches. The fat side of each belly is heated for 60 seconds and the lean side is heated for 30 seconds. The bellies are now chilled in a −65° F. freezer for 5 minutes. After chilling the bellies are sliced shingle style on an Allbright-Nell bacon slicer without disarraying the slices. Each bacon belly is sliced and shingled so that approximately 3/16 to 1/4 inch of each slice is exposed both at the upper and lower shingled surfaces. The bellies are fed into the slicer so that the upper shingled surface will be made up of exposed edges which are primarily lean while the lower surface will be made up of shingled edges which are substantially completely fat.

After slicing the collected shingled slices are separated into one-pound or half-pound increments as desired and placed on cardboards. The lean top surfaces of each weight increment are conveyed under a Vibra Screw belt feeder and sprinkled with a dry curing composition, containing 68.5% sodium chloride, 28.5% sugar, 0.6% sodium nitrite, and 2.3% sodium ascorbate. The dry cure is sprinkled onto the sliced bacon at the rate of 2.34 lbs. per 100 lbs. of bacon. The increments are then packaged in saran film with the package being evacuated and sealed. Preferably, the saran packages are continuously formed in the apparatus shown and described in Patent No. 3,129,545, dated Apr. 21, 1964.

After the evacuated packages have been held at 40° F. for 24 hours the characteristic bacon color will have developed and enough cure distribution will have occurred so as to result in bacon flavor and characteristics. However, the cure distribution will not be complete or uniform within this time. As will be described below it has been ascertained that after 7 days the distribution of the cure ingredients will be sufficient for the product to be eaten but approximately 15–17 days will be required for substantially complete distribution to be achieved.

If it is desired to hasten the cure distribution so that the packaged bacon can be consumed in less than a week, then a portion of the curing composition should be distributed over the fat shingled surface as well as over the lean shingled surface. For example, 1/4 of the total dry cure can be applied to the fat side and 3/4 to the lean side. Tests have shown that when this is done the cure distribution will be adequate after only three days in the evacuated package.

While the time that packaged bacon is held before it is opened and consumed will obviously vary, in practically all instances there will be a lapse of at least three or four days before consumption, and normally at least about a week's time. Hence, the normal handling times for the packaged sliced bacon will normally be sufficient to permit the bacon to be cured within the packages without the bacon slices ever being unshingled or separated.

A test was made to determine the rate of distribution when dry cure composition was applied to one lot of shingled stacked bacon slices prepared in accordance with the foregoing example, and two other lots prepared in the same way except for the manner in which the cure was applied. Three groups of test packages were prepared as follows:

*Dry cure method*

(1) Dry cure composition applied to the lean surface only.

(2) Dry cure applied to the lean shingled surface and also the fat shingled surface (3/4 on lean surface and 1/4 on fat surface).

(3) As a control the dry cure was applied to one complete side of each bacon slice and then the slices were reshingled.

The tests packages were put up in saran film, the packages being evacuated, sealed and stored at 40° F. Each of the packages contained one pound of bacon. Bacon samples from the packages were submitted to chemical analysis at intervals of three days, seven days, seventeen days, and thirty-one days after packaging. In making the analysis each slice in every pound analyzed was cut lengthwise into four quarters, the top (lean) quarter being designated (T), the upper middle quarter being designated (UM), the lower middle quarter being designated (LM), and the bottom (fat) quarter being designated (B).

The brine concentration was calculated as follows:

$$\frac{\text{Percent NaCl}}{\text{Percent NaCl} + \text{percent moisture}}$$

The following table contains the results of the foregoing tests:

| Age (days) | Dry Cure Method | Sample Area | Moisture (percent) | Protein (percent) | Fat (percent) | NaNO$_2$ (p.p.m.) | NaCl (percent) | Brine Conc. (percent NaCl) |
|---|---|---|---|---|---|---|---|---|
| 3 | 1 | T | 54.0 | 10.9 | 35.4 | 117 | 3.7 | 6.4 |
| 3 | 1 | UM | 29.9 | 8.6 | 61.6 | 97 | 2.1 | 6.6 |
| 3 | 1 | LM | 23.5 | 6.9 | 67.8 | 37 | 1.1 | 4.5 |
| 3 | 1 | B | 13.5 | 3.9 | 82.5 | 24 | 0.5 | 3.6 |
| 3 | 2 | T | 40.9 | 10.4 | 42.1 | 137 | 2.7 | 6.2 |
| 3 | 2 | UM | 36.2 | 10.8 | 51.8 | 96 | 2.2 | 5.7 |
| 3 | 2 | LM | 24.5 | 7.3 | 66.6 | 52 | 1.5 | 5.8 |
| 3 | 2 | B | 18.0 | 3.0 | 80.2 | 63 | 1.9 | 9.6 |
| 3 | 3 | T | 43.5 | 12.7 | 39.2 | 78 | 3.1 | 6.6 |
| 3 | 3 | UM | 27.4 | 7.4 | 61.9 | 68 | 2.1 | 7.1 |
| 3 | 3 | LM | 23.7 | 6.8 | 66.2 | 49 | 2.0 | 7.8 |
| 3 | 3 | B | 16.8 | 5.3 | 74.8 | 63 | 1.5 | 8.2 |
| 7 | 1 | T | 45.4 | 10.0 | 36.8 | 203 | 3.8 | 7.7 |
| 7 | 1 | UM | 19.3 | 5.4 | 72.3 | 94 | 2.0 | 9.4 |
| 7 | 1 | LM | 17.6 | 5.4 | 74.1 | 40 | 1.1 | 5.9 |
| 7 | 1 | B | 9.2 | 3.0 | 87.2 | 14 | 0.4 | 4.2 |
| 7 | 2 | T | 36.7 | 10.6 | 46.8 | 162 | 3.5 | 8.7 |
| 7 | 2 | UM | 15.9 | 4.5 | 77.1 | 61 | 1.5 | 8.6 |
| 7 | 2 | LM | 17.9 | 5.3 | 75.0 | 49 | 1.5 | 7.7 |
| 7 | 2 | B | 11.8 | 3.3 | 82.4 | 44 | 1.2 | 9.2 |
| 7 | 3 | T | 31.0 | 9.8 | 50.3 | 89 | 2.8 | 8.3 |
| 7 | 3 | UM | 25.9 | 7.4 | 60.2 | 89 | 2.3 | 8.2 |
| 7 | 3 | LM | 18.2 | 5.0 | 73.9 | 68 | 1.6 | 8.1 |
| 7 | 3 | B | 11.0 | 3.3 | 83.5 | 65 | 1.3 | 10.6 |
| 17 | 1 | T | 45.4 | 12.7 | 37.0 | 80 | 3.6 | 7.4 |
| 17 | 1 | UM | 26.3 | 7.1 | 64.3 | 41 | 2.0 | 7.1 |
| 17 | 1 | LM | 25.8 | 7.6 | 64.1 | 41 | 2.0 | 7.2 |
| 17 | 1 | B | 12.1 | 3.8 | 84.6 | 23 | 1.0 | 7.6 |

| Age (days) | Dry Cure Method | Sample Area | Moisture (percent) | Protein (percent) | Fat (percent) | NaNO₂ (p.p.m.) | NaCl (percent) | Brine Conc. (percent NaCl) |
|---|---|---|---|---|---|---|---|---|
| 17 | 2 | T  | 45.4 | 13.1 | 36.5 | 94 | 3.4 | 7.0 |
| 17 | 2 | UM | 21.3 | 5.6  | 71.4 | 49 | 1.7 | 7.4 |
| 17 | 2 | LM | 26.4 | 7.6  | 64.9 | 62 | 2.3 | 8.0 |
| 17 | 2 | B  | 12.6 | 3.1  | 82.4 | 41 | 1.2 | 8.7 |
| 17 | 3 | T  | 50.2 | 15.0 | 29.7 | 86 | 3.2 | 6.0 |
| 17 | 3 | UM | 25.7 | 7.4  | 65.0 | 49 | 1.6 | 5.9 |
| 17 | 3 | LM | 28.0 | 7.6  | 62.9 | 52 | 1.6 | 5.4 |
| 17 | 3 | B  | 15.9 | 4.7  | 77.2 | 31 | 1.0 | 5.9 |
| 31 | 1 | T  | 48.8 | 13.0 | 33.0 | 80.2 | 3.4 | 6.5 |
| 31 | 1 | UM | 29.0 | 8.4  | 61.4 | 34.9 | 1.8 | 5.9 |
| 31 | 1 | LM | 14.8 | 4.6  | 80.0 | 19.0 | 1.0 | 6.3 |
| 31 | 1 | B  | 7.7  | 2.9  | 88.3 | 8.8  | 0.5 | 6.1 |
| 31 | 2 | T  | 44.4 | 13.0 | 37.2 | 40.7 | 3.5 | 7.3 |
| 31 | 2 | UM | 23.2 | 6.9  | 67.8 | 15.9 | 1.9 | 7.6 |
| 31 | 2 | LM | 23.4 | 7.2  | 67.5 | 17.2 | 1.8 | 7.2 |
| 31 | 2 | B  | 10.3 | 3.1  | 85.0 | 11.1 | 0.9 | 8.0 |
| 31 | 3 | T  | 37.9 | 10.2 | 48.5 | 54.4 | 2.8 | 6.9 |
| 31 | 3 | UM | 28.9 | 7.8  | 59.0 | 69.4 | 2.6 | 8.3 |
| 31 | 3 | LM | 18.1 | 4.9  | 78.4 | 23.2 | 1.3 | 6.7 |
| 31 | 3 | B  | 7.2  | 2.4  | 90.1 | 15.0 | 0.8 | 10.0 |

The data in the foregoing table indicates that after three days the salt and nitrite concentrations are relatively even throughout the slices with methods (2) and (3) while with method (1) the levels are lower at the bottom (fat area) and lower middle sections of the slices. In terms of brine concentration the level is lower (3.6%) than the over-all brine concentration (5.9%) of the segment but nevertheless this is evidence of considerable salt migration. At seven days the brine concentration of the fat area increased to 4.2% and at seventeen days the brine concentration was extremely uniform or stable from top to bottom of the segment. It is interesting to note that with method (3) the salt level of the fat quarter (B) fell from 1.5% to 0.8% as the salt migrated to areas of greater moisture.

It is obvious from the data in the foregoing table that it is not necessary to distribute dry cure over the entire surface of each slice in order to insure adequate distribution and uniformity of cure in three to seven days. On the other hand, application of dry cure on the lean shingled surface only resulted in somewhat low brine concentration in the fat area within three and seven days. It appears that a small application of dry cure to the fat side of the shingled stacked bacon is advisable if distribution of salt in nitrite is desired within three to seven days. However, if it is assumed that the packaged bacon will not be consumed within one week after packaging, then application of the dry cure to the lean shingled surface only will be adequate.

The procedure of Example 1 (FIG. 1) may be varied by changing the order of the steps as will be illustrated in connection with the following examples.

EXAMPLE 2 (FIG. 2)

The skinned bellies are smoked for 15 minutes in dense hardwood smoke. After smoking the bellies are heated in the infra-red oven, each belly being heated for 50 seconds on the fat side and for 25 seconds on the lean side. After heating the bellies are chilled in a −65° F. freezer until cold enough to be formed and sliced. The bellies are then sliced, increments weighed out, dry cure applied and packaged as described in Example 1.

EXAMPLE 3 (FIG. 3)

Skinned bellies smoked and surface heated as described in Example 2. Then one-third of the dry cure is sprinkled on the fat surface of each belly (i.e. 0.78 lb. of dry cure per 100 lbs. of meat) after surface heating thereof. The bellies are then chilled and processed as described in Example 2 except that only the remaining two-thirds of the dry cure (i.e. 1.56 lb. dry cure per 100 lbs. of meat) is sprinkled onto the lean shingled surfaces before packaging.

In the foregoing examples, the subjecting of the bacon bellies to surface heating in the infrared oven had the following desirable effects:

(1) The fat surface of the bellies turned golden brown in color.

(2) The lean surfaces of the bellies acquired a thin layer of denatured protein which resulted in a slightly subdued color closely resembling conventional bacon color in appearance.

(3) When smoke is applied to cold meat which is not subsequently heated, it imparts a pungent odor to the meat, and when such meat is handled, the hands become stained brown and impermeated with an undesirable odor. Application of radiant heat in the manner described substantially reduced such odor impartation and staining of the hands.

(4) The frying characteristics of the bacon were improved since the slices have less tendency to stick to the fry pan and as a result did not "brown" the pan as much.

(5) It is possible to control the shrink of the meat to comply with governmental (M.I.D.) requirements.

The necessity for controllably shrinking the meat comes about because of the addition thereto of dry cure at the final stages of the process just before packaging. As a result of this addition the yield of packaged bacon would normally be somewhat in excess of 100%. Such a yield would not be permissible except perhaps with use of special labeling which might detract from the market acceptance of the product.

The following table will serve to show the effect of the surface heating in the infra-red oven and the effect of subsequent chilling in controlling the shrinkage of the meat.

TABLE 1

| Belly | Time in IR Oven Fat Side (secs.) | Time in IR Oven Lean Side (secs.) | Initial Weight (lb.) | Weight Out of IR Oven | Percent Shrink. | Weight After Chill | Total Percent Shrink. |
|---|---|---|---|---|---|---|---|
| 1 | 40 | 20 | 12.50 | 12.40 | 0.80 | 12.20 | 2.4 |
| 2 | 50 | 25 | 12.00 | 11.87 | 1.08 | 11.70 | 2.5 |
| 3 | 60 | 30 | 11.97 | 11.78 | 1.59 | 11.60 | 3.1 |
| 4 | 70 | 35 | 12.47 | 12.14 | 2.65 | 11.95 | 4.2 |

It will be seen that the process of the present invention as described above in connection with FIGS. 1, 2 and 3 lends itself to being carried out on a continuous or semi-continuous basis. For example, considering the process of FIG. 1, this may be carried out on a conveyorized line with the skinned bellies being fed into a chill tunnel at the beginning of the line and the sliced bacon with dry cure applied being packaged in the continuous machine at the discharge end of the line. Intermediate steps are carried out in suitable apparatus with a minimum of handling. The product could easily flow through such a continuous production line in 15 minutes or under.

A number of changes or variations can be introduced into the process described in connection with FIGS. 1–3. For example, instead of smoking the skinned bellies in a smokehouse they may be dipped in a commercially known liquid smoke preparation. Instead of dipping the liquid smoke may be applied by spraying if desired.

In carrying out the smoking of the skinned bellies in a smoking tunnel or in a smokehouse, considerable variation is permitted depending upon the density of the smoke, the air velocity of the smoke, and the velocity of the smoke. With increased smoke density and increased velocity it is possible to reduce the smoking time to as little as 5 minutes.

Chilling of the surfaces of the bacon bellies may be rapidly obtained in a variety of ways including, besides passing through a −65° F. freezer tunnel, such other techniques as application of carbon dioxide snow.

The control shrinkage may be obtained either by combination of treatment in the infra-red oven and the cooler (e.g. shrinking 0.8% in the infra-red oven, and 1.5% in the cooler during a 20 hour chill at 20° F.), or all of the shrinking can be accomplished in the infra-red oven with only negligible shrinking occurring during rapid tempering (e.g. 2 hours) in a freezer or cooler.

Variations in the dry cure composition may be employed such as substituting concentrated sweeteners for sugar. For example, sodium cyclamate, calcium cyclamate or hexamic acid could be used. A typical dry cure formula with such a sweetener would be:

| | Percent |
|---|---|
| Salt | 96.2 |
| Sodium nitrite | 0.82 |
| Sodium ascorbate | 1.47 |
| Sodium cyclamate | 1.47 |

If desired sodium nitrate or potassium nitrate may be included in the curing compositions, e.g. 0.75% thereof.

With the foregoing dry cure formulation only 1.66 lb. would be required for each 100 pounds of meat.

It will be understood that certain other changes and modifications may be made in the foregoing procedures without departing from the spirit and scope of the invention.

What is claimed as new is:

1. The method of preparing packaged sliced bacon from skinned bacon bellies which comprises, smoking the bellies, heating the surfaces only of the smoked bellies to set the smoke, chilling the bellies prior to forming, forming the bellies, slicing the bellies and collecting the slices in shingled condition, applying dry cure composition onto at least one shingled surface without any appreciable amount of said dry cure composition being applied except to one of the two shingled surfaces and said dry cure composition being the only curing treatment employed, and packaging the shingled slices in containers which are substantially free of oxygen, said chilling and forming steps being carried out before or after said smoking and surface heating steps.

2. The method of preparing packaged sliced bacon from skinned bacon bellies which comprises, chilling said bellies, forming said chilled bellies, smoking said formed bellies, heating only the surfaces of said smoked bellies, chilling the surfaces of said bellies, slicing said bellies and collecting the slices in shingled condition, applying dry cure composition onto at least one shingled surface without any appreciable amount of said dry cure composition being applied except to one of the two shingled surfaces and said dry cure composition being the only curing treatment employed, and packaging the shingled slices in containers which are substantially oxygen free.

3. The method of preparing packaged sliced bacon from skinned bacon bellies which comprises, chilling said bellies to approximately 28° F., forming said bellies, smoking said bellies, heating the fat sides of said bellies for approximately 50–60 seconds each and the lean sides for approximately 25–30 seconds each, rapidly chilling the surfaces only of said bellies, slicing said bellies and collecting said slices in shingled condition, distributing dry cure composition onto at least the lean shingled surface without any appreciable amount of said dry cure composition being applied except to one of the two shingled surfaces and said dry cure composition being the only curing treatment employed, and packaging weighed amounts of said shingled slices in containers substantially free of oxygen.

4. The method of claim 3 in which said smoking is carried out by exposing said bellies to an atmosphere of dense smoke and said surface heating is carried out by exposing the surfaces of said bellies to radiant heat.

5. The method of claim 3 in which said smoking is carried out by treating the surfaces of said bacon bellies with a liquid smoke preparation and said surface heating is carried out by exposing the surfaces of said bellies to radiant heat.

6. The method preparing packaged sliced bacon from skinned bacon bellies which comprises, smoking said bellies, heating only the surfaces of said smoked bellies, chilling the smoked bellies sufficiently for forming purposes, forming said bellies, slicing said bellies and collecting the slices in shingled condition, distributing dry cure composition onto at least the lean shingled surface without any appreciable amount of said dry cure composition being applied except to one of the two shingled surfaces and said dry cure composition being the only curing treatment employed, and packaging the shingled slices in containers which are substantially oxygen free.

7. The method of preparing packaged sliced bacon from skinned bacon bellies which comprises, smoking said bellies, heating only the surfaces of said smoked bellies, applying dry cure to the fat surface of each belly, chilling the bellies sufficiently for forming purposes, forming said bellies, slicing said bellies and collecting the slices in shingled condition, distributing dry cure composition onto at least the lean shingled surface without any appreciable amount of said dry cure composition being applied except to one of the two shingled surfaces and said dry cure composition being the only curing treatment employed, and packaging the shingled slices in containers which are substantially oxygen free.

References Cited

UNITED STATES PATENTS

| | | | |
|---|---|---|---|
| 2,844,478 | 7/1958 | Hanley et al. | 99—159 |
| 2,902,369 | 9/1959 | Komarik | 99—159 |
| 2,937,097 | 5/1960 | Draudt et al. | 99—229 |
| 3,220,854 | 11/1965 | Zwart | 99—159 |
| 3,230,860 | 1/1966 | Barrett et al. | 99—159 |

HYMAN LORD, *Primary Examiner.*

A. LOUIS MONACELL, *Examiner.*